US008977790B2

(12) United States Patent
Circello (10) Patent No.: US 8,977,790 B2
(45) Date of Patent: Mar. 10, 2015

(54) PERIPHERAL MODULE REGISTER ACCESS METHODS AND APPARATUS

(75) Inventor: Joseph C. Circello, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 1807 days.

(21) Appl. No.: 12/032,286

(22) Filed: Feb. 15, 2008

(65) Prior Publication Data

US 2009/0210590 A1    Aug. 20, 2009

(51) Int. Cl.
*G06F 13/12* (2006.01)
*G06F 13/24* (2006.01)

(52) U.S. Cl.
CPC ..................................... *G06F 13/24* (2013.01)
USPC ............................................. 710/65; 710/64

(58) Field of Classification Search
USPC ............................................................ 10/65
See application file for complete search history.

(56) References Cited

U.S. PATENT DOCUMENTS

| | | | |
|---|---|---|---|
| 5,511,229 A | 4/1996 | Tsujimoto | |
| 6,401,156 B1 * | 6/2002 | Mergard et al. | 710/266 |
| 6,477,599 B1 | 11/2002 | Suzuki et al. | |
| 6,493,774 B2 | 12/2002 | Suzuki et al. | |
| 2002/0062408 A1 | 5/2002 | Jahnke et al. | |
| 2002/0133661 A1 * | 9/2002 | Suzuki et al. | 710/308 |
| 2003/0145149 A1 | 7/2003 | Nagano | |
| 2005/0210178 A1 * | 9/2005 | Klingman | 711/1 |
| 2006/0143252 A1 * | 6/2006 | Perterson et al. | 707/204 |

FOREIGN PATENT DOCUMENTS

| | | |
|---|---|---|
| JP | 61011873 | 1/1986 |
| JP | 02123447 | 5/1990 |
| JP | 05120211 | 5/1993 |
| JP | 05204837 | 8/1993 |
| JP | 11212903 | 8/1999 |
| KR | 10-2008-0002419 A1 | 1/2008 |
| KR | 1020080002419 A1 * | 1/2008 |

OTHER PUBLICATIONS

PCT Application No. PCT/US2009/031200 Search Report and Written Opinion mailed Jul. 28, 2009.

* cited by examiner

*Primary Examiner* — Henry Tsai
*Assistant Examiner* — John Roche
(74) *Attorney, Agent, or Firm* — Sherry W. Schumm (57) ABSTRACT

An embodiment of an electronic system includes a processing element, a bus controller, and a peripheral module. The processing element executes machine readable code for performing a data transfer of an x-bit wide data value between the processing element and the peripheral module. Performing the data transfer includes providing a processing element-provided address corresponding to a y-bit wide data register of the peripheral module, where y is less than x. The bus controller receives the processing element-provided address, and in response, performs a series of multiple data transfers with the peripheral module. This includes providing a first peripheral address for a first data transfer of the series, and providing at least one different peripheral address for at least one other data transfer of the series. The peripheral module maps the first peripheral address and the at least one different peripheral address to the y-bit wide data register.

19 Claims, 6 Drawing Sheets

PERIPHERAL MODULE REGISTER ACCESS METHODS AND APPARATUS

TECHNICAL FIELD

Embodiments of the inventive subject matter relate to methods and apparatus for accessing registers of peripheral modules, and more particularly to methods and apparatus for a higher-bit-width processing element to access a lower-bit-width data register of a peripheral module.

BACKGROUND

A typical processing architecture includes a processing element (e.g., a processor core) adapted to execute software instructions that may result in the transfer of data between the processor core and a data register of a peripheral module. In some cases, an architecture may include a higher-bit-width processor core and a peripheral module with a lower-bit-width data register. For example, a particular processing architecture may be designed to include a 32-bit processor core that can execute software for writing 32-bit data values to an 8-bit wide write register of a peripheral module. In such a case, the software may decompose a 32-bit data value into four 8-bit bytes, and may perform four consecutive write data transfers of one byte each to the peripheral module address. Similarly, in order to read a 32-bit data value from a peripheral module register with an 8-bit wide read register, the software may perform four consecutive read data transfers of one byte each from the peripheral module address, and may concatenate the four bytes to produce the 32-bit data value.

Each access instruction consumes processor core cycles, and therefore performing multiple accesses in order to transfer data between a higher-bit-width processor core and a peripheral module with a lower-bit-width data register is inherently inefficient. However, certain design parameters (e.g., backward compatibility for software executed on new and older processor cores, and the relatively small physical size of peripheral modules with lower-bit-width data registers, for example) continue to compel architecture developers to incorporate slave peripheral modules with lower-bit-width data registers into processing architectures with higher-bit-width processor cores. With a desire to increase processing architecture performance, what are needed are methods and apparatus adapted to enable more efficient data transfers between higher-bit-width processor cores and lower-bit-width data registers of peripheral modules, while providing for backward compatibility for software that may be executed on new and older processor cores.

DETAILED DESCRIPTION

Embodiments described herein include methods and apparatus for reading data from and/or writing data to data registers within various types of peripheral modules. As will be explained in detail below, for an electronic system (e.g., a chip) configuration with a peripheral module having a y-bit programming model resource (e.g., a data register) and an x-bit processing element (e.g., a processor core), where x is greater than y, system performance may be improved, using an embodiment that includes additional x-bit programming model locations that are mapped in the peripheral module to the existing y-bit programming model resource. For example, in a system in which y=8 and x=32, improved peripheral performance may be obtained over traditional systems by including one or more 32-bit locations within the programming model of the peripheral module, according to an embodiment, where the new 32-bit locations are mapped by the peripheral module to the existing 8-bit programming model resource.

Figure 1:
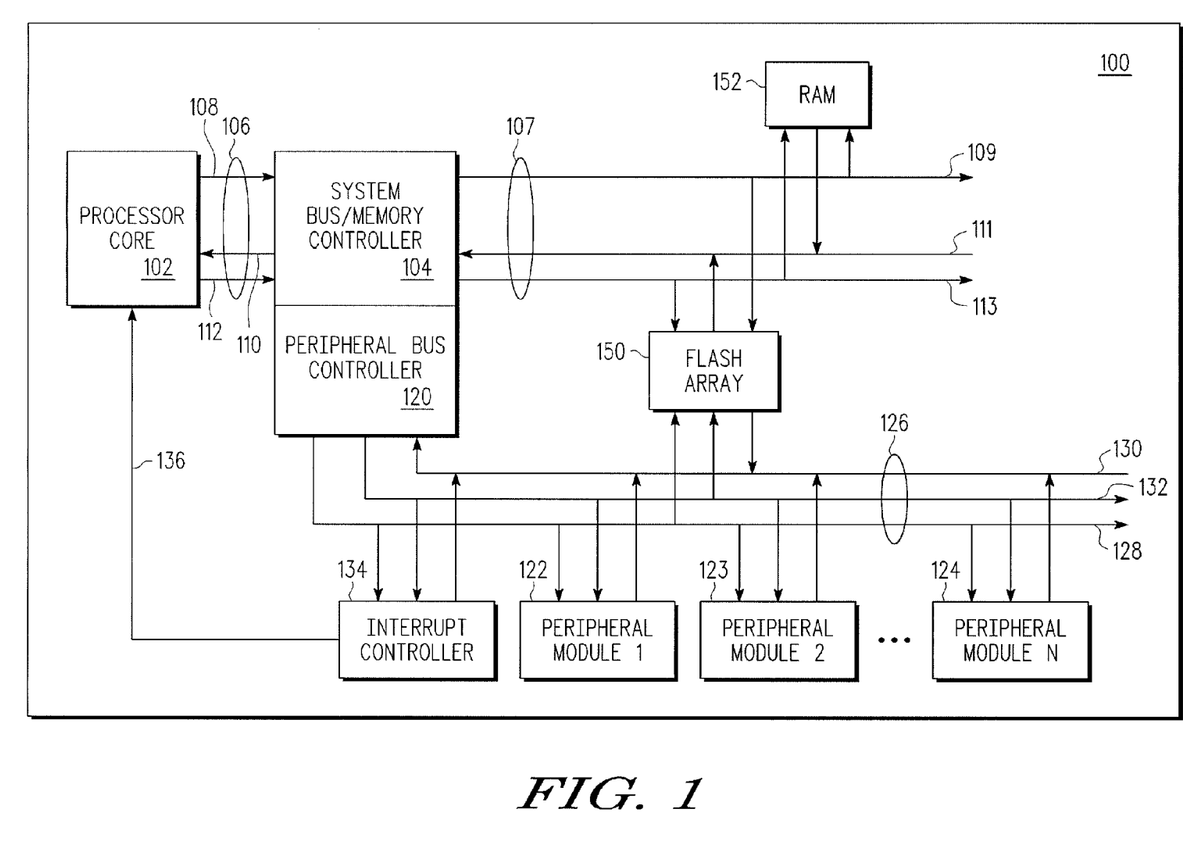
FIG. 1 illustrates a simplified block diagram of an electronic system, in accordance with an example embodiment.

The various embodiments may be implemented in any of a number of system architectures, and FIG. 1 illustrates a simplified block diagram of an electronic system 100, in accordance with a particular example embodiment. As the example embodiment of FIG. 1 illustrates, an electronic system for accessing data registers within a peripheral module may include a processor core (e.g., processor core 102) as a processing element. It is to be understood that other electronic system embodiments may include other types of processing elements, where a "processing element" may be defined as a programmable hardware module that is adapted to execute software instructions that initiate data transfers between the processing element and a peripheral module. For example, a processing element may be a hardware module selected from a group that includes a processor core, a non-core processing element, a Direct Memory Access (DMA) unit, and/or other hardware modules that are programmable and adapted to execute software instructions that initiate data transfers between the processing element and a peripheral module. Accordingly, although the figures and description herein may discuss embodiments in which an electronic system includes a processor core, it is to be understood that the scope of the embodiments includes electronic systems that include other types of processing elements.

Referring now to FIG. 1 and a particular example embodiment, electronic system 100 includes one or more processor cores 102 (or other processing elements), one or more system bus controllers 104, a system bus 106, 107, one or more peripheral modules 122, 123, 124, a peripheral bus 126, an interrupt controller peripheral module 134, and/or one or more memory blocks (e.g., Flash array 150 and random access memory 152). Although electronic system 100 is illustrated as having a single processor core 102, an electronic system may include multiple processor cores, in other embodiments. In addition, although three peripheral modules 122-124 are illustrated, an electronic system may have more or fewer peripheral modules, in other embodiments.

Processor core 102 may include, for example, a microcontroller, microprocessor or digital signal processor (DSP) core, in various embodiments. Processor core 102 is an x-bit core, which includes x-bit wide registers. Processor core 102 may interface with x-bit wide data busses or wider bit-width data busses, in various embodiments. In a particular embodiment, processor core is a 32-bit core (i.e., x=32), although processor core 102 may be an 8-bit, 16-bit, 64-bit, 128-bit or other bit width processor core, in other embodiments.

Processor core 102 is operably coupled to other system components via system bus 106, 107, which includes address bus 108, 109, read data bus 110, 111, and write data bus 112, 113. System bus 106, 107 is illustrated to have a processor core side 106 and a memory block side 107. In an embodiment, the processor core side 106 of the system bus may pass through system bus controller 104 without significant alteration, and therefore the processor core side 106 and the memory block side 107 may be configured and operate essentially the same. In another embodiment, the configuration and/or operation of the processor core side 106 of the system bus may be different from that of the memory block side 107, and the system bus controller 104 may implement the alteration (e.g., the system bus controller 104 may perform a conversion to another bus protocol, and/or change the operating frequency, among other things). Although differences in the processor core side 106 and the memory block side 107 of the system bus may exist, they will be referred to collectively as the system bus 106, 107, for ease of description, and the read, write, and address busses associated with both sides may be referred to collectively, as well. In an embodiment, read data bus 110, 111 and write data bus 112, 113 each are x-bit wide data busses, although they may be wider bit-width data busses, in other embodiments. In addition, system bus 106, 107 may include various control lines (not illustrated), such as a read/write control signal line (e.g., to provide a read/write signal having a read state and a write state), a bus clock line (e.g., to provide a system bus clock signal), a transfer size signal line, and/or a wait signal line (e.g., to convey a bus transfer wait signal).

Processor core 102 is adapted to execute software instructions (e.g., machine-readable code) which, among other things, may cause processor core 102 to issue data access requests (e.g., read and/or write requests) over system bus 106, 107. Issuing a data access request includes processor core 102 providing an address, on address bus 108, 109, which identifies a location within a memory block 150, 152 or a peripheral module 122-124. For a write-type of data access request, processor core 102 also provides a data value on write data bus 112, 113 of system bus 106, 107. For a read-type of data access request, processor core 102 reads a data value from read data bus 110, 111 of system bus 106, 107. As will be described in more detail later, embodiments enable software executed by processor core 102 to access peripheral modules 122-124 using fewer access instructions (e.g., write instructions, read instructions, and/or move instructions). Accordingly, such accesses may be performed in a more efficient manner than traditional methods (e.g., using fewer processor cycles per byte).

System bus controller 104 is adapted to manage the flow of data being transferred between processor core 102 and various types of memory blocks over system bus 106, 107. These memory blocks may include, for example, a Flash memory array 150 (Flash) and a random access memory 152 (RAM), such as a static RAM (SRAM). In addition or alternatively, system 100 may include read only memory (ROM), such as electrically erasable programmable ROM (EEPROM), and/or other types of memory blocks.

In an embodiment, system bus controller 104 includes and/or is operatively coupled to a peripheral bus controller 120. Peripheral bus controller 120 is adapted to provide an interface between the x-bit wide system bus 106, 107 and the z-bit wide peripheral bus 126. More specifically, peripheral bus controller 120 is adapted to manage the flow of data between the system bus 106, 107 and various types of peripheral modules 122-124 and/or other system components operatively coupled to the peripheral bus 126. System bus controller 104 typically provides two basic functions. The first function includes managing the traffic flow of access from the processor core 102, and "routing" a data transfer request to the appropriate bus interface. For example, this may include routing a data transfer request to logic within the system bus controller 104 that interfaces with system bus 107, or routing the data transfer request to peripheral bus controller 120. The second function of system bus controller 104 includes implementing the bus interface for system bus 107. Similarly, peripheral bus controller 120 implements the bus interface for peripheral bus 126. In an embodiment, peripheral bus controller 102 also handles the hardware decomposition of x-bit data accesses from the processor into a series of z-bit wide data accesses for peripheral bus 126, where z is less than x, as will be described in more detail later.

Peripheral bus 126 is operatively coupled between peripheral bus controller 120 and peripheral modules 122-124. In an embodiment, peripheral bus 126 is a synchronous, non-multiplexed bus that includes an address bus 128, a read data bus 130, and a write data bus 132. In an alternate embodiment, the read data bus 130 and the write data bus 132 may be implemented as the same physical data bus when the peripheral bus data lines are operated as bi-directional data bus lines. In an embodiment, read data bus 130 and write data bus 132 each are z-bit wide data busses (i.e., read data bus 130 includes z read data lines, and write data bus 132 includes z write data lines). Peripheral bus 126 also may include various control lines (not illustrated), such as a read/write control signal line (e.g., to provide a read/write signal having a read state and a write state), a bus clock line (e.g., to provide a peripheral bus clock signal), a transfer size signal line, and/or a wait signal line (e.g., to convey a bus transfer wait signal).

One or more peripheral modules 122-124 are operatively connected to peripheral bus 126. At least one of peripheral modules 122-124 is adapted to perform multiple-address register mapping, in accordance with various embodiments, although some of peripheral modules 122-124 may not be so adapted. As will be explained in more detail below, "multiple-address register mapping" refers to an ability of a peripheral module 122-124 to map multiple addresses provided on address bus 128 (or address offsets derived from the addresses) to a single read and/or write data register within the peripheral module 122-124. As used herein, the term "address offset" may refer to a full address, a portion of a full address (e.g., one or more of the least significant bits of an address), or some other derivation of an address. Peripheral modules 122-124 may include, for example, any one or more peripherals selected from a group that includes, but is not limited to, cyclic-redundancy-check (CRC) calculation modules, checksum calculation modules, serial peripheral interfaces (SPIs), universal asynchronous receiver/transmitters (UARTs), counters, timers, memory controllers, display controllers (e.g., liquid crystal display (LCD) controllers), user interface controllers (e.g., keypad, touchscreen, and/or pointer controllers), interrupt controllers, and power-on reset generators to name a few. Electronic system 100 may include various other peripherals, as well, which may or may not incorporate embodiments of the inventive subject matter.

Interrupt controller peripheral module 134 also is operatively coupled to peripheral bus 126. Interrupt controller peripheral module 134 is a type of peripheral module that is adapted to receive interrupt signals (not illustrated) from some or all of peripheral modules 122-124, and to provide corresponding interrupt signals via an interrupt line 136 to processor core 102.

In various alternate embodiments, electronic system 100 may include additional or different components from those illustrated in FIG. 1 and discussed above. For example, electronic system 100 also may include one or more timing sources, external interfaces, general purpose input/output (GPIO) ports, analog interfaces, additional or different busses, voltage regulators, and/or power management circuits, among other things. Electronic system 100 may be implemented as a system-on-a-chip (SoC), in which the various system components are integrated onto a single integrated circuit, in an embodiment. In another embodiment, electronic system 100 may be implemented as a system-in-package (SiP), in which the various system components are integrated onto multiple integrated circuits that are packaged together in a single package. In still other embodiments, various components or sets of components may be integrated onto multiple integrated circuits and packaged separately.

Figure 2:
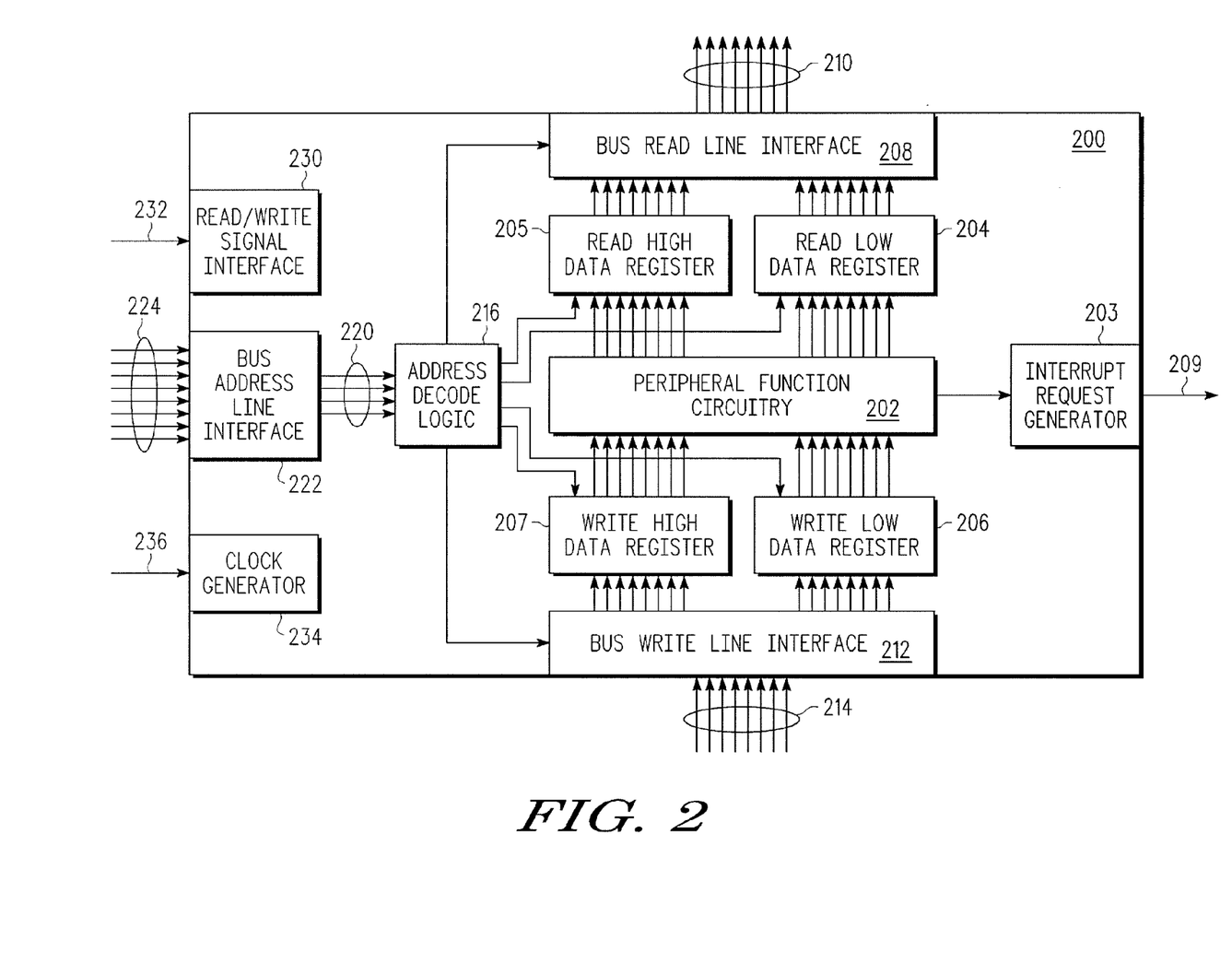
FIG. 2 illustrates a simplified block diagram of a peripheral module, in accordance with an example embodiment.

FIG. 2 illustrates a simplified block diagram of a peripheral module 200 (e.g., one of peripheral modules 122-124, FIG. 1) adapted to perform multiple-address register mapping, in accordance with an example embodiment. The inclusion of FIG. 2 is intended to provide a general discussion of various embodiments. In actuality, embodiments may be incorporated into peripheral modules of various configurations and having a variety of functionalities, and some specific examples are described later in conjunction with FIGS. 5 and 6. Accordingly, FIG. 2 and the discussion thereof are not to be taken in a limiting sense.

Peripheral module 200 includes peripheral function circuitry 202 operably coupled to one or more of the at least one data register 204, 205, 206, 207. Each time a data value is written into a write data register 206, 207, peripheral function circuitry 202 may process or otherwise consume the data before a subsequent data value is written into the write data register 206, 207. Similarly, each time peripheral function circuitry 202 writes a data value into a read data register 204, 205, peripheral function circuitry 202 may wait to write a subsequent data value into the read data register 204, 205 until an external read data transfer of the data value has been performed. Peripheral function circuitry 202 writes data to and/or reads data from the at least one data register 204-207, in accordance with an embodiment. Peripheral function circuitry 202 is adapted to perform the primary function of the peripheral module 200, which may include data transfer and/or computational functions, among other things. For example, but not by way of limitation, peripheral function circuitry 202 may be adapted to perform a mathematical function based on data in one or more write data registers 206, 207 and to provide a result in one or more read data registers 204, 205 (e.g., to compute a cyclic redundancy check (CRC) value, for example), to transfer data from a write data register 206, 207 to a read data register 204, 205, and/or to perform any of a number of other primary functions. In an embodiment, peripheral module 200 may include an interrupt request generator 203, and peripheral function circuitry 202 may be adapted to cause interrupt request generator 203 to produce an interrupt signal on a peripheral bus interrupt signal line 209. For example, but not by way of limitation, peripheral function circuitry 202 may cause an interrupt to be generated when data (e.g., a result) is ready to be read from a read data register 204, 205 and/or when peripheral function circuitry 202 is ready for data to be provided from a write data register 206, 207.

Peripheral module 200 also includes read/write signal interface 230, which is adapted to detect the state of a read/write signal present on a peripheral bus read/write signal line 232. When the read/write signal indicates a read data transfer and address decode logic 216 has decoded an address offset corresponding to a read data register 204, 205, peripheral module 200 may transfer data within the read data register 204, 205 corresponding to the decoded address offset onto peripheral bus read data lines 210 (e.g., read data bus 130, FIG. 1). Similarly, when the read/write signal indicates a write data transfer and address decode logic 216 has decoded an address offset corresponding to a write data register 206, 207, peripheral module 200 may transfer data present on the peripheral bus write data lines 214 (e.g., write data bus 132, FIG. 1) into the write data register 206, 207 corresponding to the decoded address offset. In an alternate embodiment, any one or more of registers 204-207 may function as both a read data register and a write data register (e.g., a single physical register may function as a read/write data register). In such an embodiment, the interface between the read data lines 210 and the write data lines 214 may be combined into a single interface (rather than two interfaces 208, 212, as illustrated), and the direction of data transfer (e.g., from the register to the read data lines or from the write data lines to the register) may be controlled in accordance with the state of the read/write data signal. In addition, in an embodiment and as mentioned previously, the peripheral bus read data lines 210 and the peripheral bus write data lines 214 may be implemented as the same physical lines when the peripheral bus data lines are operated as bi-directional data bus lines.

Peripheral module 200 also includes clock generator 234, which is adapted to receive a clock signal from a peripheral bus clock signal line 236, and to generate one or more internal clocks that affect the timing of various internal operations (e.g., clocking data into or out of a register 204-207, performing a computation, decoding an address or offset, and so on).

Peripheral module 200 also may include one or more write data registers 206, 207, each of which is adapted to receive and store data transferred by bus write line interface 212 from the peripheral bus write data lines 214. Similarly, peripheral module 200 also may include one or more read data registers 204, 205, each of which is adapted to store and provide data to peripheral bus read data lines 210 via bus read line interface 208. In an embodiment, at least one of registers 204-207 are y-bit wide registers, where y is less than x (i.e., the bit width, y, of the register is less than the bit width, x, of the processing element (e.g., processor core 102) and/or system bus 106, 107, FIG. 1). In a particular embodiment, registers 204-207 are 8-bit wide registers (i.e., y=8), although any one or more of registers 204-207 may be 4-bit, 16-bit, 32-bit or other bit width registers, in other embodiments.

In the embodiment illustrated in FIG. 2, peripheral module 200 includes two read data registers (read low data register 204 and read high data register 205), and two write data registers (write low data register 206 and write high data register 207). Although peripheral module 200 is shown to include two read data registers 204, 205 and two write data registers 206, 207, a peripheral module may have more or fewer read data registers and/or write data registers, in other embodiments. For example, in some other embodiments, a peripheral module may have only one or more read data registers or one or more write data registers, but not both. In still other embodiments, a peripheral module may have a single read data register and/or a single write data register. In still other embodiments, a transmit buffer (e.g., a first-in, first-out or FIFO buffer) may be associated with either or both of the write data registers 206, 207. Accordingly, for each write data transfer, a value within a write data register 206, 207 may be transferred into the buffer, and the other values of the buffer may be shifted through the buffer away from the write data register 206, 207. Similarly, a receive buffer (e.g., a FIFO buffer) may be associated with either or both of the read data registers 204, 205. Accordingly, for each read data transfer, a value may be transferred from the buffer into a read data register 204, 205, and other values in the buffer may be shifted toward the read data register 204, 205.

Peripheral module 200 also includes address decode logic 216, in an embodiment, which is adapted and configured to decode signals present on address offset bitlines 220 based on addresses received by bus address line interface 222 from peripheral bus address lines 224 (e.g., peripheral address bus 128, FIG. 1). Based on the decoding process, address decode logic 216 may cause bus read line interface 208 to transfer data from one of read data registers 204, 205 to peripheral bus read lines 210, or address decode logic 216 may cause bus write line interface 212 to transfer data from peripheral bus write lines 214 to one of write data registers 206, 207.

In an embodiment, each data register 204-207 is mapped to one or more address offsets. In a particular embodiment, at least one of data registers 204-207 are mapped to multiple address offsets, which adapts peripheral module 200 to perform multiple-address register mapping, as mentioned briefly above, and which will be explained in more detail below. Memory resources other than data registers 204-207 may be mapped to one or more of the address offsets, also, although such other resources are not discussed herein. As mentioned previously, an address offset may be a full address, a portion of a full address (e.g., one or more of the least significant bits of an address), or some other derivation of an address. In the illustrated embodiment, an address offset corresponds to the four least significant bits of an address that may be received on address lines 224, and accordingly four address offset bitlines 220 may be adapted to transfer the four least significant bits of the address to address decode logic 216. Although eight peripheral bus address lines 224 and four address offset bitlines 220 are illustrated, more or fewer peripheral bus address lines 224 and/or address offset bitlines 220 may be included in other embodiments. With four address offset bitlines 220, as illustrated, address decode logic 216 may receive and may be capable of decoding up to sixteen different address offsets (e.g., 0000 to 1111 (binary) or 0x0 to 0xF (where the "0x" prefix identifies a hexadecimal value)). In other embodiments, address decode logic 216 may be adapted to decode more or fewer address offsets. Address decoding may be hardwired, and thus immutable, in an embodiment, or may be implemented at least partially in software based on a fixed or configurable address map, in other embodiments.

The address offset decoding logic (whether implemented in hardware, software or both) may be represented as a memory map. In an embodiment, at least one of data registers 204-207 is mapped to multiple addresses. As used herein, the term "register address offset set" refers to a set of multiple address offsets that are mapped to a particular register. In a particular embodiment, a first address offset for a particular register (i.e., address offset 0x0) may correspond to a first address that is specified, by the processing element (e.g., processor core 102, FIG. 1), for reading y-bit data values, and thus that address offset may be referred to below as a "y-bit-wide access address offset," where the term "y-bit-wide" refers to the width of the data being accessed, and not to the width of the address offset, which may or may not be y bits wide. One or more other address offsets for the particular register (i.e., address offsets 0x4, 0x5, 0x6, and 0x7) may correspond to a second address that is specified, by the processing element, for reading x-bit data values, and thus those address offsets may be referred to below as "x-bit-wide access address offsets," where the term "x-bit-wide" refers to the width of the data being accessed, and not to the width of the address offset, which may or may not be x bits wide. Y-bit-wide access address offsets and x-bit-wide access address offsets also or alternatively may correspond to reading y-bit and x-bit data values, in other embodiments. As specified in the example 8-bit view of a peripheral module memory map in Table 1, below, read low data register 204 is mapped to a register address offset set that includes five address offsets (i.e., offsets 0x0, 0x4, 0x5, 0x6, and 0x7), and write low data register 206 is mapped to a register address offset set that includes five different address offsets (i.e., offsets 0x2, 0x8, 0x9, 0xA, and 0xB):

TABLE 1

8-bit View Memory Map Example

| OFFSET | REGISTER |
|---|---|
| 0x0 | READ LOW |
| 0x1 | READ HIGH |
| 0x2 | WRITE LOW |
| 0x3 | WRITE HIGH |
| 0x4 | READ LOW |
| 0x5 | READ LOW |
| 0x6 | READ LOW |
| 0x7 | READ LOW |
| 0x8 | WRITE LOW |
| 0x9 | WRITE LOW |
| 0xA | WRITE LOW |
| 0xB | WRITE LOW |
| 0xC-0xF | RESERVED |

The same example memory map may be represented alternatively in a 32-bit view as in Table 2, below:

TABLE 2

32-bit View Memory Map Example

| OFFSET | REGISTER | | | |
|---|---|---|---|---|
| 0x0 | READ LOW | READ HIGH | WRITE LOW | WRITE HIGH |
| 0x4 | | READ LOW | | |
| 0x8 | | WRITE LOW | | |
| 0xC | | RESERVED | | |

The memory maps of Table 1 and Table 2 are provided for example purposes only, and numerous memory map variations may exist. What may be gleaned from the memory map of Table 1 and Table 2 is that, according to various embodiments, address decode logic 216 is configured and adapted to map a set of multiple address offsets (e.g., a register address offset set) to all or a same portion of a single data register of the peripheral module 200, although address decode logic 216 also may be configured to map one or more other sets of multiple addresses to one or more other data registers.

In a particular embodiment, at least one of the address offsets in a register address offset set may correspond to a y-bit read or write data transfer, and a number, n (where n=x/y), of other address offsets in a register address offset set may correspond to an x-bit read or write data transfer that is performed as a series of n, y-bit wide data transfers to sequential addresses, and where each address of the sequential addresses is an address that corresponds to y-bit data (e.g., 8-bit byte data). In other words, in such an embodiment, each of the "other" address offsets may correspond to a y-bit portion of the x-bit data value being written or read. For example, if write data register 204 is an 8-bit register, and a processing element (e.g., processor core 102, FIG. 1) executes an instruction to write an 8-bit data value to write low data register 206, then an address may be provided on peripheral bus address lines 224, which corresponds to a first address offset that is mapped to the write low data register 206 (e.g., address offset 0x2 from Table 1, above). In contrast, if the processing element executes an instruction to write a 32-bit data value to write data register 206, then four addresses (i.e., n=4, and n=x/y=32/8=4) may be provided on peripheral bus address lines 224, which correspond to four other address offsets, each of which is mapped to the write low data register 206 (e.g., address offsets 0x8, 0x9, 0xA, and 0xB from Table 1, above).

As will be explained in more detail below, in a system in which an x-bit processing element (e.g., processor core 102, FIG. 1) accesses y-bit data registers (e.g., registers 204-207) of a peripheral module (e.g., peripheral module 200), and x is greater than y, the adaptation of mapping multiple address offsets to a single register enables the processing element to perform an x-bit data transfer with the peripheral module through execution of fewer program instructions, when compared to traditional systems and methods. For example, for a 32-bit write data transfer from the processing element to an 8-bit register of a peripheral module, the processing element may execute a single 32-bit write instruction, and the 32-bit data value may be decomposed by the peripheral bus controller (e.g., peripheral bus controller 120, FIG. 1 or by bus controller 104, in an alternate embodiment) into four 8-bit writes to four peripheral module addresses corresponding to four address offsets that are mapped to the single 8-bit register. In an embodiment, the four peripheral module addresses and the four address offsets are consecutive addresses and address offsets, although they may be non-consecutive in other embodiments. Instead of traditional methods in which the processing element would execute four 8-bit write instructions to write the 32-bit data value, the processing element may instead perform fewer than four write instructions (e.g., a single 32-bit write instruction or two 16-bit write instructions). This may significantly reduce the number of processor cycles consumed in order to complete the 32-bit write data transfer.

Figure 3:
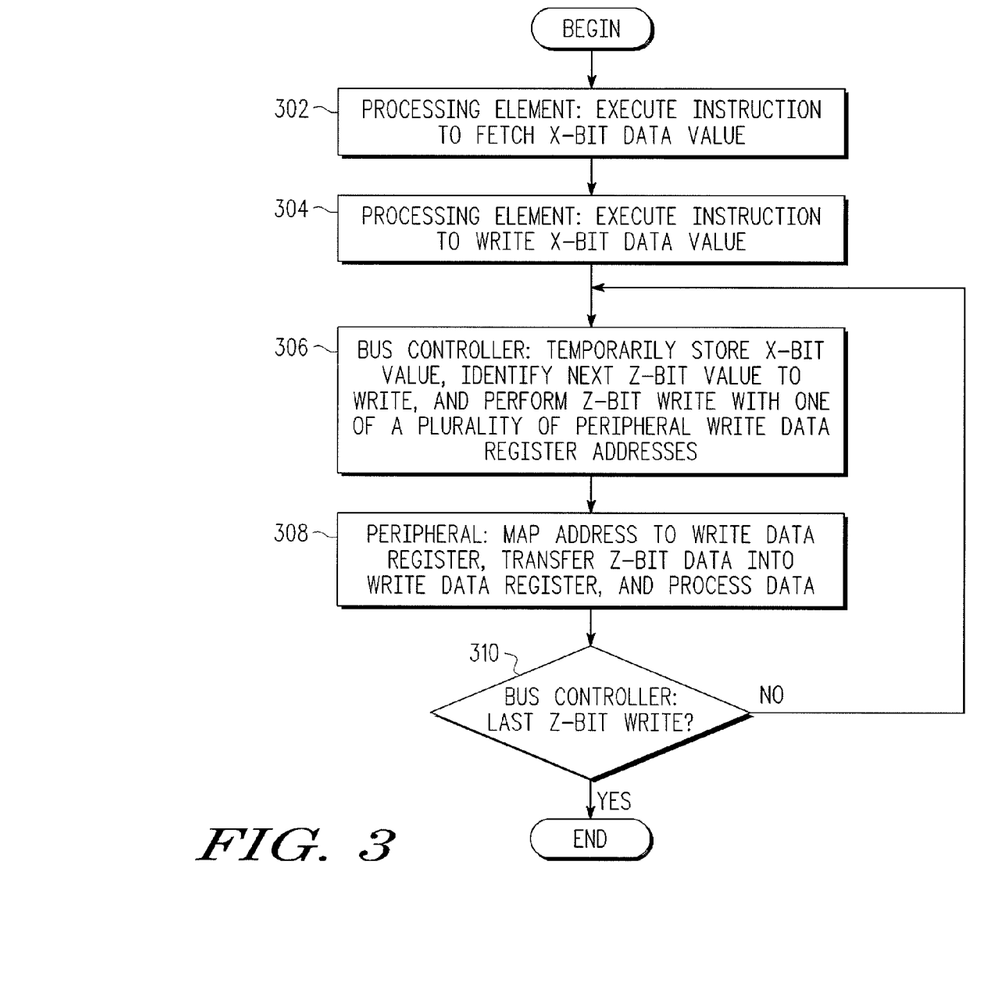
FIG. 3 illustrates a flowchart of a method for writing to a data register of a peripheral module, in accordance with an example embodiment.
Figure 4:
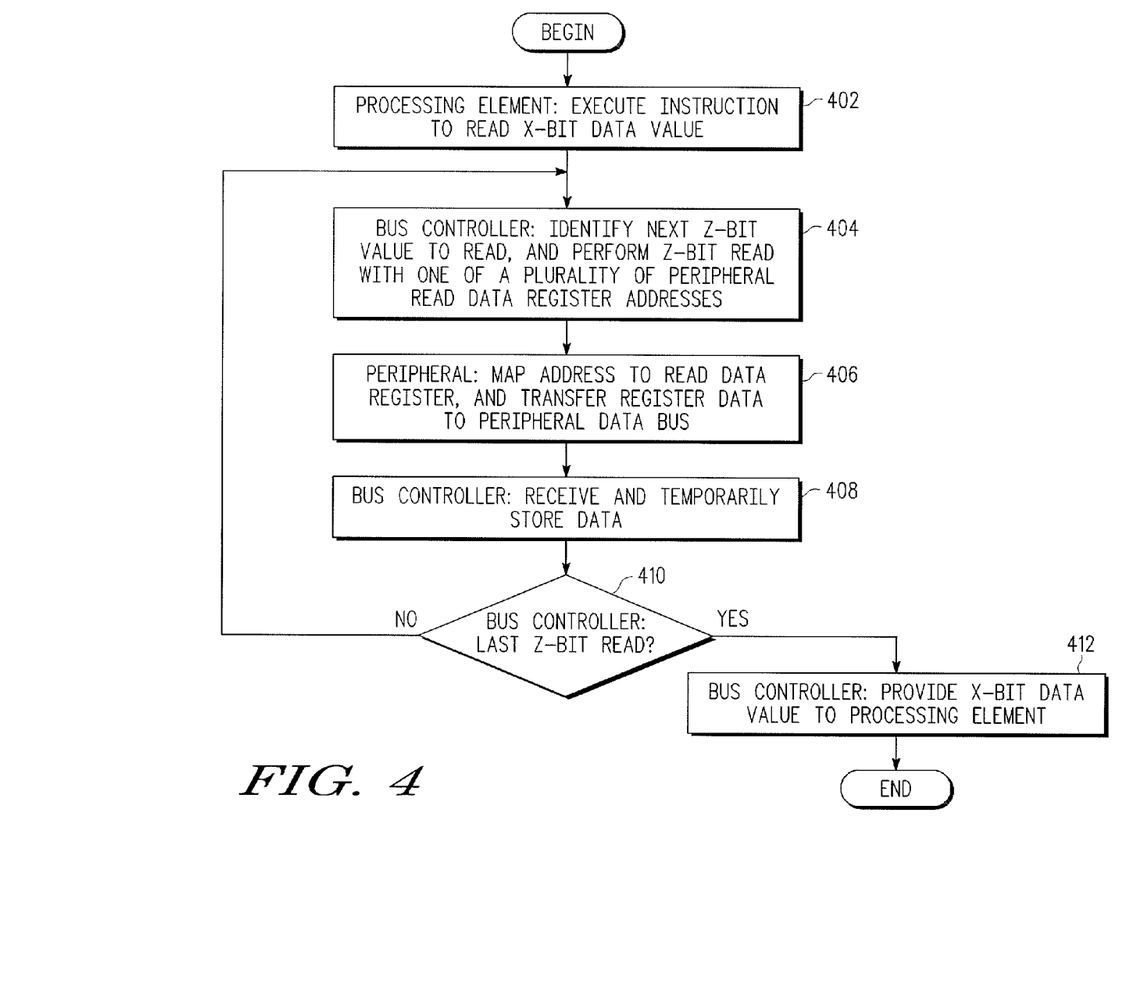
FIG. 4 illustrates a flowchart of a method for reading a data register of a peripheral module, in accordance with an example embodiment.

Embodiments of methods for performing write data transfers and read data transfers are described in more detail in conjunction with FIGS. 3 and 4, respectively. FIGS. 3 and 4 should be viewed in conjunction with FIGS. 1 and 2, as various elements of FIGS. 1 and 2 are referred to below, for clarity, in the description of the methods of FIGS. 3 and 4.

Referring first to a description of embodiments for performing write data transfers, FIG. 3 illustrates a flowchart of a method for writing to a data register of a peripheral module (e.g., peripheral module 200), in accordance with an example embodiment. More particularly, the method corresponds to a 32-bit processing element (e.g., processor core 102) fetching a 32-bit data value from memory (e.g., from Flash array 150 or RAM 152), and writing the 32-bit data value to an 8-bit write data register (e.g., write low data register 206) of a peripheral module (e.g., peripheral module 200). It is to be understood that, in other embodiments, a different bit width processing element may fetch a different width data value from memory, and may write the data value to a different width write data register.

The method may begin, in block 302, when the processing element executes one or more software instructions to fetch a 32-bit data value from memory. For example, the processing element (e.g., processor core 102) may set the state of a read/write signal of system bus 106, 107 to a read state, and may provide an address on address bus 108, 109 of system bus 106, 107, where the address corresponds to a memory location within Flash array 150 or RAM 152. The processing element may then read the 32-bit data value, when available, from read data bus 110, 111, and may store the 32-bit data value in one or more registers or other memory locations.

In block 304, the processing element may execute one or more software instructions to write the 32-bit data value to the 8-bit write data register of the peripheral module. It is to be understood that the fetch instruction of block 302 and the write instruction of block 304 may be collapsed into a single move instruction, in an embodiment, which specifies that the 32-bit data value should be moved from the memory location (e.g., within Flash array 150 or RAM 152) to the 8-bit write data register of the peripheral module. In any event, the processing element may set the state of the read/write signal of system bus 106, 107 to a write state, and may provide an address on address bus 108, 109 corresponding to a first address offset (e.g., address offset 0x8, from Table 1, above) that will be mapped, by the peripheral module, to the 8-bit write data register of the peripheral module. In addition, the processing element provides the 32-bit data value on the write data bus 112, 113 of the peripheral bus.

In block 306, the peripheral bus controller (e.g., peripheral bus controller 120, FIG. 1) receives the address and the 32-bit data value, and may temporarily store the 32-bit data value in one or more registers. In an embodiment, the bus controller 120 performs a series of z-bit wide data write data transfers, where z is the width of the write data bus 132 of the peripheral bus 126. For ease of description, this example will assume that the write data bus 132 has a same bit width as the write data register (e.g., write low data register 206) of the peripheral module. Accordingly, in this example, z=8. It is to be understood that the width of the write data bus 132 may be less than the width of the write data register (e.g., z may be less than or equal to y, in various embodiments), in which case the system bus controller 104 and/or peripheral bus controller 120 may perform multiple write data transfers in order to write a y-bit data value to the write data register.

Keeping with the example in which z=8, each write data transfer includes identifying the next 8-bit data value to write, and performing the 8-bit write data transfer using one of a plurality of write data register addresses that are mapped, in the peripheral module, to the single write data register. For example, for the initial write data transfer, a particular byte of the 32-bit data value may be selected as the first byte to write, and the bus controller 120 may use a first write data register address that is mapped to the write data register of the peripheral module. The actual write data transfer may involve setting the state of the read/write signal of peripheral bus 126 to a write state, extracting and providing the first byte of the 32-bit data value to the write data bus 132 of the peripheral bus 126, and providing the first write data register address on the address bus 128 of the peripheral bus 126, although not necessarily in that order.

In block 308, the peripheral module receives the read/write signal along with the first write data register address on the address bus 128 and the first byte on the write data bus 132. The address decode logic 216 of the peripheral module maps the address offset indicated in the first address to the write data register 206, and the first byte may be transferred into the write data register 206 and processed by the peripheral function circuitry 202. For example, referring also to Table 1, above, the address offset indicated in the first address may be an offset of 0x8, which is one of the four consecutive address offsets mapped to the write low data register 206.

Immediately following block 306 and/or in parallel with the performance of block 308, the bus controller 120 may determine whether it has written the last 8-bit data value of the 32-bit data value it is writing to the write data register 206, in block 310. When the last value has been written (i.e., when the bus controller 120 has completed writing all four bytes of the 32-bit data value), the method may end. When the last value has not been written, the method may return to block 306, in which the bus controller 120 performs the next 8-bit wide data write data transfer in the series. For example, for the second write data transfer, a different byte of the 32-bit data value may be selected as the second byte to write, and the bus controller 120 may use a second write data register address that is mapped to the write data register of the peripheral module (e.g., a write data register address corresponding to an offset of 0x9 of Table 1, above). Again, the write data transfer may involve setting the state of the read/write signal of peripheral bus 126 to a write state, extracting and providing the second byte to the write data bus 132 of the peripheral bus 126, and providing the second write data register address on the address bus 128 of the peripheral bus 126, although not necessarily in that order. This iterative process may continue until all four bytes of the stored 32-bit data value have been written to the write data register 206.

A potential advantage to implementing embodiments of the inventive subject matter is that the processing element may execute fewer instructions, when compared to traditional methods, in order to write an x-bit wide data value to a y-bit wide register of a peripheral module or to read an x-bit wide data value from the peripheral module, when x is greater than y. Accordingly, fewer processor cycles may be consumed in order to access the data. Example code is provided below, which corresponds to a processing element fetching and writing a plurality of 32-bit data values to a CRC module in order for the CRC module to perform a CRC calculation of a region of a Flash array (e.g., Flash array 150). Using various embodiments, the processing element may execute a 32-bit long move (mov.l) operation according to the following assembly code in order to write each 32-bit data value fetched from memory to an 8-bit register within the CRC module. The CRC register is indicated to be a write low data register of the CRC module for example purposes only:

```
# d0 = byteCount/4
# a0 = pointer to Flash array
# a1 = pointer to CRC write low data register
L%1:                    # longword copy, unrolled 4x
    mov.l (%a0)+, (%a1)   # copy source data 4-byte value to CRC
    mov.l (%a0)+, (%a1)   # copy source data 4-byte value to CRC
    mov.l (%a0)+, (%a1)   # copy source data 4-byte value to CRC
    mov.l (%a0)+, (%a1)   # copy source data 4-byte value to CRC
    subq.l &4, %d0        # decrement loop counter
    bne.b L%1             # done? If not, branch back to top of loop
```

In comparison, using traditional techniques to transfer the same 32-bit data values from memory to an 8-bit register within the peripheral device, the processing element would execute four times as many move operations, where each move operation would write a byte at a time (mov.b), rather than writing an entire 32-bit data value at once, as exemplified in the following code:

```
# d0 = byteCount
# a0 = pointer to Flash array
# a1 = pointer to CRC write low data register
L%0:                    # byte copy, unrolled 4x
```

-continued

```
    mov.b (%a0)+, (%a1)   # copy source data byte value to CRC
    mov.b (%a0)+, (%a1)   # copy source data byte value to CRC
    mov.b (%a0)+, (%a1)   # copy source data byte value to CRC
    mov.b (%a0)+, (%a1)   # copy source data byte value to CRC
    subq.l &4, %d0        # decrement loop counter
    bne.b L%0             # done? If not, branch back to top of loop
```

Regarding potential performance benefits, a processing element implementing the first code example in accordance with an embodiment may experience a measured performance of about 2.25 CPU cycles per byte transferred, whereas a processing element implementing the second code example in accordance with traditional methods may experience a measured performance of about 6.00 CPU cycles per byte transferred. According to the measured performances, execution of the first code example is about 2.66 times faster than execution of the second code example, when executed on a same processor core, both examples operating at the same clock frequency. Accordingly, implementing code to take advantage of the various embodiments may provide for significant improvements to processing element performance, when compared to traditional methods.

In addition to implementing various embodiments in order to write x-bit wide data values to y-bit wide write data registers of a peripheral module, embodiments also or alternatively may be implemented in order to read x-bit data values from y-bit read data registers of a peripheral module. FIG. 4 illustrates a flowchart of a method for reading a data register of a peripheral module, in accordance with an example embodiment. More particularly, the method corresponds to a 32-bit processing element (e.g., processor core 102) reading a 32-bit data value from an 8-bit read data register (e.g., read low data register 204) of a peripheral module (e.g., peripheral module 200, FIG. 2). It is to be understood that, in other embodiments, a different bit width processing element may read a different width data value from a different width read data register of a peripheral module.

The method may begin, in block 402, when the processing element executes one or more software instructions to read a 32-bit data value from an 8-bit register of a peripheral module. For example, referring also to FIG. 1, processor core 102 may set the state of a read/write signal of system bus 106, 107 to a read state, and may provide an address on address bus 108, 109 of system bus 106, 107 (referred to herein as a "processing element-provided address"), where the address corresponds to an 8-bit read data register (e.g., read low data register 204) of a peripheral module.

In block 404, the bus controller 120 receives the read/write signal and the core provided address, and in response, performs a first in a series of multiple z-bit wide data read data transfers, where z is the width of the read data bus 130 of the peripheral bus 126. As will be clarified below, the bus controller 120 will build the x-bit wide data value during the course of the series of read data transfers by temporarily placing each z-bit wide data value that is read into an appropriate portion of a register or other memory location, thus building the entire x-bit wide value. For ease of description, this example will assume that the read data bus 130 has a same bit width as the read data register (e.g., read low data register 204) of the peripheral module. Accordingly, in this example, z=8. It is to be understood that the width of the read data bus 130 may be less than the width of the read data register (e.g., z may be less than or equal to y, in various embodiments), in which case the bus controller 120 may perform multiple read data transfers in order to read a y-bit data value from the read data register.

Keeping with the example in which z=8, each read data transfer includes identifying the next 8-bit data value to read, and performing the 8-bit read data transfer using one of a plurality of read data register addresses that are mapped, in the peripheral module, to the single read data register. For example, for the initial read data transfer, a particular byte of a 32-bit data value may be selected as the first byte to read, and the bus controller 120 may use a first read data register address that is mapped to the read data register of the peripheral module. The actual read data transfer may involve setting the state of the read/write signal of peripheral bus 126 to a read state, providing the first read data register address on the address bus 128 of the peripheral bus 126, reading the first byte of the 32-bit data value from the read data bus 130 of the peripheral bus 126, when available, and storing the first byte in a first byte position of a 32-bit register or other memory location accessible within the bus controller 120.

In block 406, the peripheral module receives the read/write signal along with the first read data register address on the address bus 128. The address decode logic 216 of the peripheral module maps the address offset indicated in the first address to the read data register 204, and the first byte may be transferred from the read data register 204 to the read data bus 130 of the peripheral bus 126. For example, referring also to Table 1, above, the address offset indicated in the first address may be an offset of 0x4, which is one of the four address offsets mapped to the read low data register 204.

In block 408, the bus controller 120 may read the first byte from the read data bus 130, and temporarily store the data in the appropriate position within the register or other memory location being used to build the 32-bit data value. The bus controller 120 may determine, in block 410, whether it has read the last byte of the 32-bit data value it is reading from the read data register 204. When the last value has not been read, the method may return to block 404, in which the bus controller 120 performs the next 8-bit wide read data transfer in the series. For example, for the second read data transfer, a different byte of the 32-bit data value may be selected as the second byte to read, and the bus controller 120 may use a second read data register address that is mapped to the read data register of the peripheral module (e.g., a read data register address corresponding to an offset of 0x5 of Table 1, above). Again, the read data transfer may involve setting the state of the read/write signal of peripheral bus 126 to a read state, providing the second read data register address on the address bus 128 of the peripheral bus 126, reading the second byte from the read data bus 130 of the peripheral bus 126, when available, and temporarily storing the second byte in an appropriate byte position of the 32-bit register or other memory location within which the 32-bit data value is being constructed.

When it is determined, in block 410, that the last value has been read (i.e., when all four bytes of the 32-bit data value have been read from the read data register 204), the bus controller 120 may provide the 32-bit data value to the processing element, in block 412, by transferring the data within the 32-bit temporary holding register or memory location onto the read data bus 110, 111 of the system bus 106, 107. The processing element may then transfer the data value from the read data bus 110, 111 into a 32-bit register or other memory location, and may process the data. The method may then end.

Figure 5:
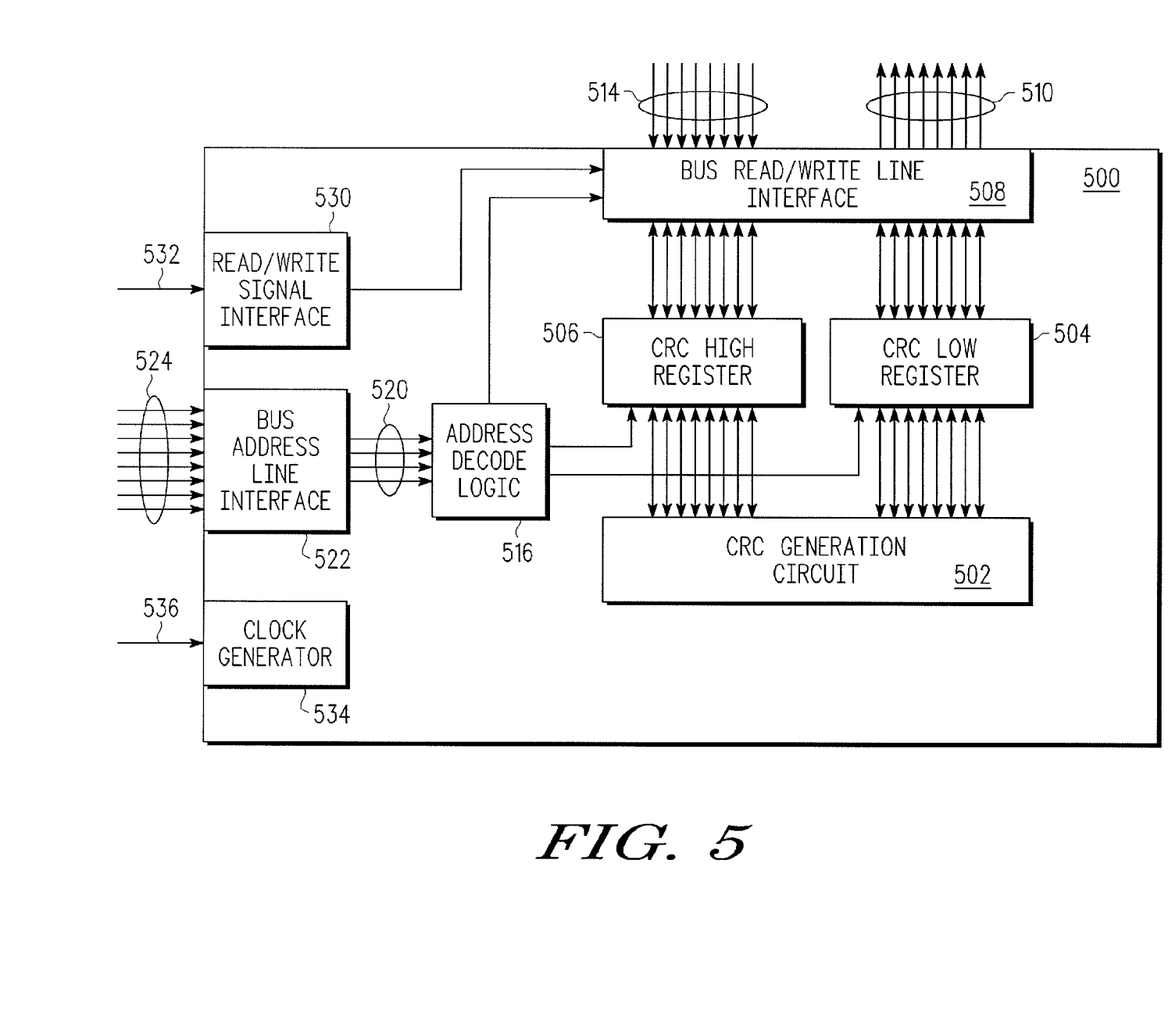
FIG. 5 illustrates a simplified block diagram of a cyclic redundancy check (CRC) module, in accordance with an example embodiment.
Figure 6:
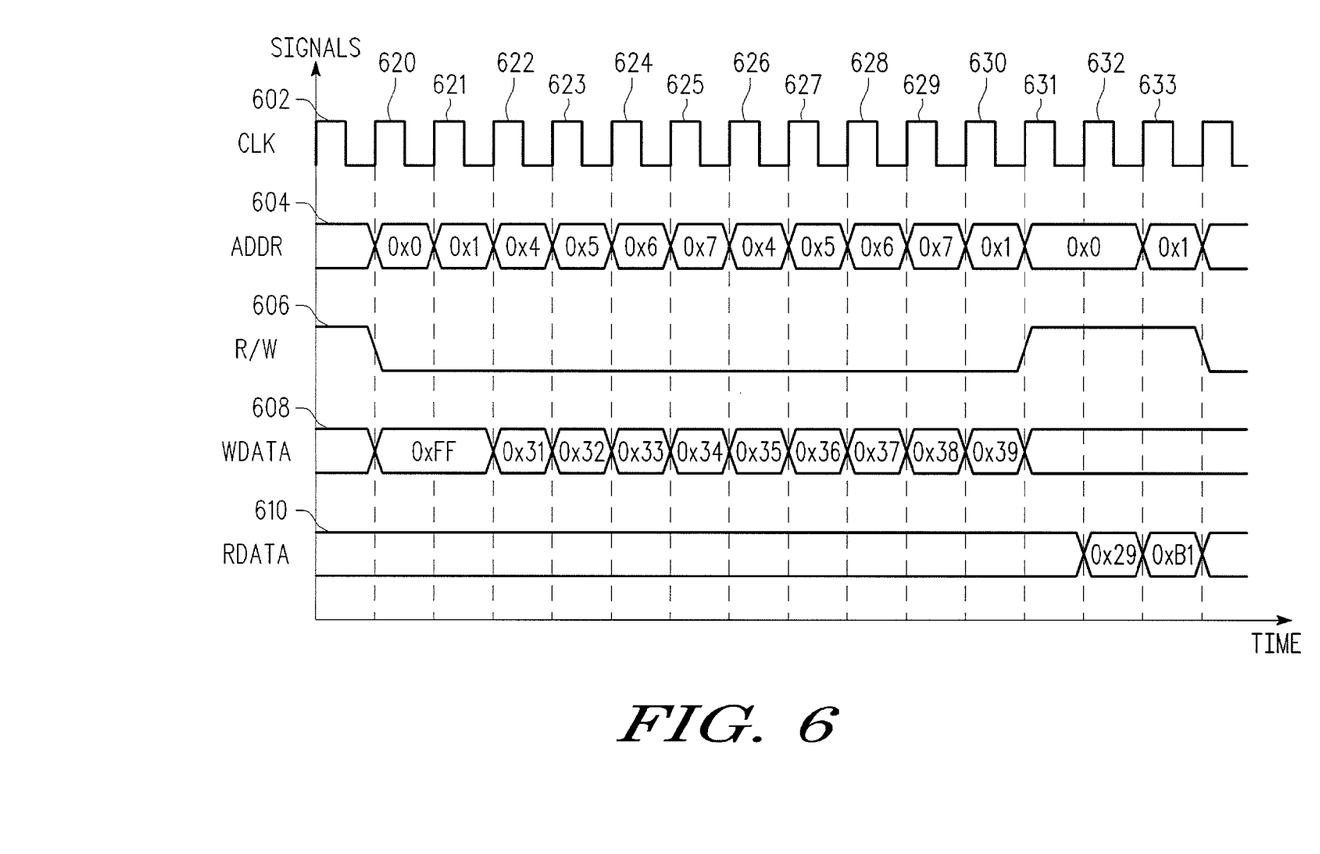
FIG. 6 illustrates a timing diagram for various signals relevant to write and read data transfers performed in conjunction with generating a CRC value, in accordance with an example embodiment.

A specific example of a peripheral module will now be described in conjunction with FIGS. 5 and 6. More particularly, FIGS. 5 and 6 illustrate a block diagram and timing diagram, respectively, in accordance with an example embodiment implemented in a CRC module. It is to be understood that the peripheral module embodiments described in conjunction with FIGS. 5 and 6 are not to be taken as limiting implementation of various embodiments in only a CRC module. Instead, embodiments may be implemented in a wide variety of peripheral module types, and a non-exclusive list of such peripheral module types was provided above.

FIG. 5 illustrates a simplified block diagram of a CRC module 500, in accordance with an example embodiment. As mentioned previously, a CRC module is one of a variety of types of peripheral modules that may be implemented according to an embodiment. CRC module 500 includes CRC generator circuitry 502, a CRC low data register 504, a CRC high data register 506, and address decode logic 516, in accordance with an embodiment. CRC module 500 also includes clock generator 534, which is adapted to receive a clock signal from a peripheral bus clock signal line 536, and to generate one or more internal clocks that affect the timing of various internal operations.

CRC generator circuitry 502 is adapted to calculate a CRC value for a memory block based on a seed value and the data stored in the memory block. In an example embodiment, CRC generator circuitry 502 includes a 16-bit CRC generator circuit, and the seed value is a 16-bit seed value. During operation, a processing element (e.g., processor core 102, FIG. 1) may write a first byte of the 16-bit seed value into the CRC low data register 504 and a second byte of the 16-bit seed value into the CRC high data register 506. Subsequent to loading the 16-bit seed value, the processing element may fetch one or more 32-bit data values from the memory block, and write each 32-bit data values to the CRC low data register 504, in an embodiment, which is distinguishable from traditional systems in which the processing element would fetch a plurality of 8-bit data values from the memory block and write each 8-bit data value to the CRC low data register (e.g., thus performing approximately four times the number of fetching and writing data transfers to transfer the same amount of data). The bus controller (e.g., bus controller 120, FIG. 1) may then write each byte of the 32-bit data value to one of a plurality of addresses that are mapped, by address decode logic 512, to the CRC low data register 504. Each byte may then be processed by the CRC generator circuitry 502, in order to generate the 16-bit CRC value in the combined CRC high data register 506 and CRC low data register 504. After writing the last data value to the CRC low data register 504, the processing element may then read the resulting 16-bit CRC value from the combined CRC high data register 506 and the CRC low data register 504.

CRC module 500 also includes read/write signal interface 530, which is adapted to detect the state of a read/write signal present on a peripheral bus read/write signal line 532. When the read/write signal indicates a read data transfer and address decode logic 516 has decoded an offset corresponding to the CRC low data register 504 or the CRC high data register 506, CRC module 500 may transfer data within the CRC low data register 504 or the CRC high data register 506, as specified by the decoded offset, onto peripheral bus read data lines 510 (e.g., read data bus 130, FIG. 1). Similarly, when the read/write signal indicates a write data transfer and address decode logic 516 has decoded an offset corresponding to CRC low data register 504 or the CRC high data register 506, CRC module 500 may transfer data present on the peripheral bus write data lines 514 (e.g., write data bus 132, FIG. 1) into the CRC low data register 504 or the CRC high data register 506, as specified by the decoded offset.

Each of CRC low data register 504 and CRC high data register 506 are adapted to receive and store data transferred by bus read/write line interface 508 from the peripheral bus write data lines 514. In addition, CRC low data 504 register and CRC high data register 506 are adapted to provide data stored within them to CRC generator circuit 502. CRC high data register 506 and CRC low data register 504 also are adapted to receive and store the resulting 16-bit CRC value as each data byte is written to the CRC low data register 504. The resulting 16-bit CRC value stored in the CRC high data register 506 and the CRC low data register 504 may be transferred by bus read/write line interface 508 onto the peripheral bus read data lines 510 during a read data transfer. In an embodiment, CRC low data register 504 or the CRC high data register 506 are 8-bit wide registers, although either or both of CRC low data register 504 or the CRC high data register 506 may be 4-bit, 16-bit, 32-bit or other bit width registers, in other embodiments. In the embodiment illustrated in FIG. 5, CRC module 500 includes one CRC low data register 504 and one CRC high data register 506, although a CRC module may have more CRC low data registers and/or CRC high data registers, in other embodiments.

CRC module 500 also includes address decode logic 516, in an embodiment, which is adapted and configured to decode signals present on address offset bitlines 520 based on addresses received by bus address line interface 522 from peripheral bus address lines 524 (e.g., address bus 128, FIG. 1). Based on the decoding process, address decode logic 516 may cause bus read/write line interface 508 to transfer data from one of CRC low data register 504 or the CRC high data register 506 to peripheral bus read lines 510, or address decode logic 516 may cause bus read/write line interface 508 to transfer data from peripheral bus write lines 514 to one of CRC low data register 504 or the CRC high data register 506.

In an embodiment, the CRC high data register 506 is mapped to a single address offset, and the CRC low data register 504 is mapped to a plurality of address offsets. This adapts CRC module 500 to perform multiple-address register mapping, as discussed above. In a particular embodiment, one of the CRC low data register address offsets (i.e., address offset 0x1) may correspond to a first address that is specified, by the processing element, for writing 8-bit data values, and thus that address offset is a y-bit-wide access address offset. The other CRC low data register address offsets (i.e., address offsets 0x4, 0x5, 0x6, and 0x7) may correspond to a second address that is specified, by the processing element, for writing 32-bit data values, and thus those address offsets are x-bit-wide access address offsets. As specified in the example 8-bit view of a peripheral module memory map in Table 3, below, CRC low data register 504 is mapped to a register address offset set that includes five address offsets (i.e., offsets 0x1, 0x4, 0x5, 0x6, and 0x7):

TABLE 3

8-bit View of CRC Memory Map Example

| OFFSET | REGISTER |
|---|---|
| 0x0 | CRC HIGH |
| 0x1 | CRC LOW |
| 0x2 | RESERVED |
| 0x3 | RESERVED |
| 0x4 | CRCL0 (CRC LOW) |
| 0x5 | CRCL1 (CRC LOW) |
| 0x6 | CRCL2 (CRC LOW) |
| 0x7 | CRCL3 (CRC LOW) |
| 0x8-0xF | RESERVED |

"CRCL0" refers to a first byte of a 32-bit data value, which corresponds to an address offset (i.e., address offset 0x4) that maps to the CRC low data register 504. Similarly, "CRCL1" refers to a second byte of the 32-bit data value, which corresponds to an address offset (i.e., address offset 0x5) that also maps to the CRC low data register 504, and so on. The memory map of Table 3 is provided for example purposes only, and numerous memory map variations may exist. What may be gleaned from the memory map of Table 3 is that, according to various embodiments, address decode logic 516 is configured and adapted to map a set of multiple address offsets (e.g., a register address offset set) to a single data register of the CRC module 500, although address decode logic 516 also may be configured to map one or more other sets of multiple addresses to one or more other data registers.

FIG. 6 illustrates a timing diagram for various signals relevant to write and read data transfers performed in conjunction with generating a CRC value, in accordance with an example embodiment. The timing diagram includes a clock signal 602 (CLK), an address bus signal 604 (ADDR), a read/write signal 606 (R/W), a write data bus signal 608 (WDATA), and a read data bus signal 610 (RDATA). In addition to the signals depicted in FIG. 6, one or more additional signals may also be present during generation of a CRC value, such as an enable signal and a wait signal, for example, although such signals are not illustrated or described for purposes of brevity. During each write data transfer, the state of the read/write signal 606 is set to a write state (e.g., a low state), and during each read data transfer, the state of the read/write signal 606 is set to a read state (e.g., a high state). Addresses and data may be clocked during a low-to-high transition of clock signal 602, as illustrated in accordance with an embodiment, or alternatively during a high-to-low transition of clock signal 602. The various operations performed during CRC value generation may take more or fewer clock cycles than is depicted in FIG. 5, and more or fewer bytes of data may be used to generate the CRC value. The below description refers also to elements of FIG. 5.

In order to generate a CRC value, in accordance with an embodiment, the following sequence of processes may occur, although the sequence may be altered while still achieving a substantially similar result, in other embodiments. CRC value generation may begin when the processing element (e.g., processor core 102, FIG. 1) loads a seed value, in an embodiment. This may include, for example, the processing element writing a first byte (0xFF) of a 16-bit seed value to the CRC high data register 506, and writing a second byte (0xFF) of the 16-bit seed value to the CRC low data register 504. In order to write the first byte of the 16-bit seed value, the processing element may provide the first byte along with an address that corresponds to an address offset that the CRC module's address decode logic 516 maps to the CRC high data register 506 (e.g., address offset 0x0 from Table 3, above). The address offset may be mapped and the first byte (0xFF) may be clocked into the CRC high data register 506 on a first clock cycle 620, as illustrated in FIG. 6. Similarly, in order to write the second byte of the 16-bit seed value, the processing element may provide the second byte along with an address that corresponds to an address offset that the CRC module's address decode logic 516 maps to the CRC low data register 504 (e.g., address offset 0x1 from Table 3, above). This address offset may be referred to as the y-bit-wide access address offset for the CRC low data register 504. The address offset may be mapped and the second byte (0xFF) may be clocked into the CRC low data register 504 on a second clock cycle 621. The 16-bit seed value (0xFFFF) is thus loaded into the CRC high data register 506 and the CRC low data register 504.

The processing element may then execute code to fetch a first 32-bit data value from the memory block for which the CRC value is being generated, and to write the 32-bit data value to an address that corresponds to one of the x-bit-wide access address offsets, which the CRC module's address decode logic 516 also maps to the CRC low data register 504 (e.g., address offset 0x4 from Table 3, above). The bus controller (e.g., bus controller 120, FIG. 1) may then perform a sequence of four writes to the CRC low data register 504, where each write includes writing a selected byte from the 32-bit data value. In an embodiment, a first write of the sequence writes a first byte (0x31) of the 32-bit data value and addresses a first address that maps to the CRC low data register 504, a second write of the sequence writes a second byte (0x32) of the 32-bit data value and addresses a second address that maps to the CRC low data register 504, a third write of the sequence writes a third byte (0x33) of the 32-bit data value and addresses a third address that maps to the CRC low data register 504, and a fourth write of the sequence writes a fourth byte (0x34) of the 32-bit data value and addresses a fourth address that maps to the CRC low data register 504. During clock cycles 622, 623, 624, and 625, a sequence of four address offsets (e.g., address offsets 0x4, 0x5, 0x6, and 0x7) are illustrated sequentially on the address bus signal 604 along with four bytes of data on the write data bus signal 608. As described above, the four data offsets may be mapped by the address decode logic 516 to the CRC low data bus 504, in an embodiment. At the conclusion of clock cycle 625, the CRC module 500 has received the 16-bit seed value (0xFFFF) into the CRC high data register 506 and the CRC low data register 504, and has also received four bytes (0x31, 0x32, 0x33, 0x34) into the CRC low data register 504. During the next four clock cycles 626, 627, 628, 629, four additional bytes (0x35, 0x36, 0x37, 0x38) are received into the CRC low data register 504 as a result of the processing element writing a second 32-bit data value to an address that corresponds to the x-bit-wide access address offsets (e.g., address offset 0x4). During the next clock cycle 630, one additional byte is received into the CRC low data register 504, which may represent a last data byte in the memory block for which the CRC value is being generated. Because the last value written corresponds to a byte, rather than to a 32-bit data value, the processing element may write the 8-bit data value to an address that corresponds to a y-bit-wide access CRC address offset (e.g., address offset 0x1). Clock cycle 631 represents a wait cycle, during which the CRC generator circuit 502 may complete its CRC value calculation.

In order to read the 16-bit CRC value from the CRC low data register 504 and the CRC high data register 506, the processing element may read a first byte of the 16-bit CRC value from the CRC high data register 506, and read a second byte of the 16-bit CRC value from the CRC low data register 504. In order to read the first byte of the 16-bit CRC value, the processing element may provide the address that corresponds to an address offset that the CRC module's address decode logic 516 maps to the CRC high data register 506 (e.g., address offset 0x0 from Table 3, above). The address offset may be mapped and the first byte (0x29) may be read from the CRC high data register 506 during clock cycle 632, as illustrated in FIG. 6. Similarly, in order to read the second byte of the 16-bit CRC value, the processing element may provide the address that corresponds to the y-bit-wide access address offset that the CRC module's address decode logic 516 maps to the CRC low data register 504 (e.g., address offset 0x1 from Table 3, above). The address offset may be mapped and the second byte (0xB1) may be read from the CRC low data register 504 during clock cycle 633.

Using embodiments of apparatus and methods for generating a CRC value, as illustrated and described in conjunction with FIGS. 5 and 6, a processing element may execute software instructions that write x-bit wide data values to a CRC module that has a y-bit wide CRC low data register, where x is greater than y. Accordingly, processor efficiency may be improved, using the various embodiments, over traditional apparatus and methods in which the processing element would execute more software instructions in order to write a same amount of data (e.g., the processing element would execute instructions that write only y-bit wide data values to the y-bit wide CRC low data register).

Thus, various embodiments of methods and apparatus for reading data from and/or writing data to data registers within various types of peripheral modules have been described. An embodiment of an electronic system includes a processing element, a bus controller, and a peripheral module. The processing element is adapted to execute machine readable code that causes the processing element to perform a data transfer of an x-bit wide data value, where performing the data transfer includes providing a first read/write signal and a processing element-provided address that corresponds to a y-bit wide data register of a peripheral module, and where y is less than x. The bus controller is adapted to receive the read/write signal and the processing element-provided address, and in response, to perform a series of multiple data transfers with the peripheral module, where performing the series includes providing a second read/write signal and a first peripheral address for a first data transfer of the series, and providing at least one different peripheral address for at least one other data transfer of the series. The peripheral module is configured to map the first peripheral address to the y-bit wide data register, and also to map the at least one different peripheral address to the y-bit wide data register.

In a further embodiment, the peripheral module includes a y-bit wide, first data register, which is operably coupled to a data bus, and address decode logic, operably coupled to an address bus, and configured to map a plurality of different address offsets to the first data register. In an embodiment, the electronic system further includes a system bus, and at least one memory block, where the at least one memory block and the processing element are operatively coupled together through the system bus, and where the processing element is further adapted to execute machine code to fetch data values from the memory block over the system bus. In a further embodiment, the data transfer includes a write data transfer to write the x-bit wide data value to the peripheral module, and the processing element is further adapted to provide the x-bit wide data value to the bus controller. In a further embodiment, the data transfer includes a read data transfer to read the x-bit wide data value from the peripheral module, and the bus controller is further adapted to read a plurality of y-bit wide data values from the peripheral module, to build the x-bit wide data value from the plurality of y-bit wide data values, and to provide the x-bit data value to the processing element. In a further embodiment, the electronic system also includes a peripheral bus operatively coupled between the bus controller and the peripheral module, where the peripheral bus includes a z-bit wide data bus, and wherein z is less than or equal to y. In a further embodiment, the processing element is a processing element selected from a group that includes a processor core, a non-core processing element, and a Direct Memory Access unit.

Another embodiment includes an electronic system that includes a peripheral module having a y-bit wide, first data register, which is operably coupled to a data bus, and address decode logic, operably coupled to an address bus, and configured to map a plurality of different address offsets to the first data register. In a further embodiment, the address decode logic is configured to map a first address offset of the plurality of different address offsets to the first data register for a y-bit wide data transfer, and to map x/y other address offsets of the plurality of different address offsets to the first data register for an x-bit wide data transfer that is performed as a series of x/y, y-bit wide data transfers to sequential addresses, and where each address of the sequential addresses is an address that corresponds to 8-bit byte data.

In a further embodiment, the peripheral module also includes one or more, y-bit wide additional data registers, which are operably coupled to the data bus. In a further embodiment, the peripheral module also includes a read/write signal interface adapted to receive a read/write signal, where the peripheral module is adapted to transfer a y-bit wide data value from the first data register to a read data bus of the data bus when the read write signal is in a read state, and when the address decode logic has mapped an address offset for an address present on an address bus to the first data register. In a further embodiment, the peripheral module also includes a read/write signal interface adapted to receive a read/write signal, where the peripheral module is adapted to transfer a y-bit wide data value from a write data bus of the data bus to the first data register when the read write signal is in a write state, and when the address decode logic has mapped an address offset for an address present on an address bus to the first data register. In a further embodiment, the peripheral module also includes an interrupt request generator adapted to produce an interrupt signal. In a further embodiment, the peripheral module also includes peripheral function circuitry, operably coupled to the first data register, where the peripheral function circuitry is adapted to perform a primary function of the peripheral module, and to write data to or read data from the first data register. In a further embodiment, the peripheral function circuitry is adapted to perform a cyclic redundancy check calculation.

In a further embodiment, the electronic system also includes a processing element and a bus controller. The processing element is adapted to execute machine readable code that causes the processing element to perform a data transfer of an x-bit wide data value, where performing the data transfer includes providing a first read/write signal and a processing element-provided address that corresponds to the first data register of the peripheral module, and where y is less than x. The bus controller is adapted to receive the read/write signal and the processing element-provided address, and in response, to perform a series of multiple data transfers with the peripheral module, where performing the series includes providing a second read/write signal and a first peripheral address for a first data transfer of the series, and providing at least one different peripheral address for at least one other data transfer of the series. In a further embodiment, the peripheral module is a module selected from a group that includes a cyclic redundancy check calculation module, a checksum calculation module, a serial peripheral interface, a universal asynchronous receiver/transmitter, a display controller, and a user interface controller.

Another embodiment includes a method for transferring data between a processing element and a peripheral module. The method includes the steps of receiving, by the peripheral module, a first read/write signal and a plurality of different addresses from an address bus, mapping, by the peripheral module, a plurality of different address offsets corresponding to the plurality of different addresses to a single y-bit wide data register, and transferring, by the peripheral module, a y-bit wide data value from the y-bit wide data register to a data bus when the first read/write signal is in a read state, and transferring the y-bit wide data value from the data bus into the y-bit wide data register when the first read/write signal is in a write state.

In a further embodiment, the method includes the steps of executing, by the processing element, machine readable code that causes the processing element to perform a data transfer of an x-bit wide data value, wherein performing the data transfer includes providing a second read/write signal and a processing element-provided address that corresponds to the y-bit wide data register of the peripheral module, and wherein y is less than x, receiving, by a bus controller, the second read/write signal and the processing element-provided address, and performing, by the bus controller in response to receiving the second read/write signal, a series of multiple data transfers with the peripheral module, where performing the series includes providing the first read/write signal and an address of the plurality of different addresses for each data transfer in the series. In a further embodiment, the step of mapping the plurality of different address offsets includes mapping a first address offset of the plurality of different address offsets to the data register for a y-bit wide data transfer, and mapping x/y other address offsets of the plurality of different address offsets to the data register for an x-bit wide data transfer.

While the principles of various embodiments have been described above in connection with specific systems, apparatus, and methods, it is to be clearly understood that this description is made only by way of example and not as a limitation on the scope of the inventive subject matter. Further, the phraseology or terminology employed herein is for the purpose of description and not of limitation.

The foregoing description of specific embodiments reveals the general nature of the various embodiments sufficiently so that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. An electronic system comprising:
   a processing element adapted to execute machine readable code that causes the processing element to perform a data transfer of an x-bit wide data value, wherein performing the data transfer includes providing a first read/write signal and a single processing element-provided address that corresponds to a y-bit wide data register of a peripheral module, and wherein y is less than x;
   a bus controller adapted to receive the read/write signal and the single processing element-provided address, and in response, to perform a series of multiple data transfers with the peripheral module, wherein performing the series includes providing a second read/write signal and a first peripheral address for a first data transfer of the series, and providing different peripheral addresses for each other data transfer of the series, and wherein the series includes x/y sequential data transfers; and the peripheral module configured to map the first peripheral address to the y-bit wide data register, and also to map the different peripheral addresses to the y-bit wide data register.

2. The electronic system of claim 1, wherein the peripheral module comprises:
a y-bit wide, first data register, which is operably coupled to a data bus; and
address decode logic, operably coupled to an address bus, and configured to map a plurality of different address offsets to all or a same portion of the first data register.

3. The electronic system of claim 1, further comprising:
a system bus; and
at least one memory block, wherein the at least one memory block and the processing element are operatively coupled together through the system bus, and wherein the processing element is further adapted to execute machine readable code to fetch data values from the memory block over the system bus.

4. The electronic system of claim 1, wherein the data transfer includes a write data transfer to write the x-bit wide data value to the peripheral module, and wherein the processing element is further adapted to provide the x-bit wide data value to the bus controller.

5. The electronic system of claim 1, wherein the data transfer includes a read data transfer to read the x-bit wide data value from the peripheral module, and wherein the bus controller is further adapted to read a plurality of y-bit wide data values from the peripheral module, to build the x-bit wide data value from the plurality of y-bit wide data values, and to provide the x-bit data value to the processing element.

6. The electronic system of claim 1, further comprising:
a peripheral bus operatively coupled between the bus controller and the peripheral module, wherein the peripheral bus includes a z-bit wide data bus, and wherein z is less than or equal to y.

7. The electronic system of claim 1, wherein the processing element is a processing element selected from a group that includes a processor core, a non-core processing element, and a Direct Memory Access unit.

8. An electronic system comprising:
a peripheral module having:
a y-bit wide, first data register, which is operably coupled to a data bus, and address decode logic, operably coupled to an address bus, and configured to map a plurality of different address offsets to the first data register, wherein the address decode logic is configured to:
map a first address offset of the plurality of different address offsets to the first data register for a y-bit wide data transfer, and
map x/y other address offsets of the plurality of different address offsets to the first data register for an x-bit wide data transfer that is performed as a series of x/y, y-bit wide data transfers to sequential addresses.

9. The electronic system of claim 8, wherein each address of the sequential addresses is an address that corresponds to 8-bit byte data.

10. The electronic system of claim 8, wherein the peripheral module further comprises:
one or more, y-bit wide additional data registers, which are operably coupled to the data bus.

11. The electronic system of claim 8, wherein the peripheral module further comprises:
a read/write signal interface adapted to receive a read/write signal, wherein the peripheral module is adapted to transfer a y-bit wide data value from the first data register to a read data bus of the data bus when the read write signal is in a read state, and when the address decode logic has mapped an address offset for an address present on an address bus to the first data register.

12. The electronic system of claim 8, wherein the peripheral module further comprises:
a read/write signal interface adapted to receive a read/write signal, wherein the peripheral module is adapted to transfer a y-bit wide data value from a write data bus of the data bus to the first data register when the read write signal is in a write state, and when the address decode logic has mapped an address offset for an address present on an address bus to the first data register.

13. The electronic system of claim 8, wherein the peripheral module further comprises:
an interrupt request generator adapted to produce an interrupt signal.

14. The electronic system of claim 8, wherein the peripheral module further comprises:
peripheral function circuitry, operably coupled to the first data register, wherein the peripheral function circuitry is adapted to perform a primary function of the peripheral module, and to write data to or read data from the first data register.

15. The electronic system of claim 14, wherein the peripheral function circuitry is adapted to perform a cyclic redundancy check calculation.

16. The electronic system of claim 8, further comprising:
a processing element adapted to execute machine readable code that causes the processing element to perform a data transfer of an x-bit wide data value, wherein performing the data transfer includes providing a first read/write signal and a processing element-provided address that corresponds to the first data register of the peripheral module, and wherein y is less than x; and
a bus controller adapted to receive the read/write signal and the processing element-provided address, and in response, to perform a series of multiple data transfers with the peripheral module, wherein performing the series includes providing a second read/write signal and a first peripheral address for a first data transfer of the series, and providing at least one different peripheral address for at least one other data transfer of the series.

17. The electronic system of claim 8, wherein the peripheral module is a module selected from a group that includes a cyclic redundancy check calculation module, a checksum calculation module, a serial peripheral interface, a universal asynchronous receiver/transmitter, a display controller, and a user interface controller.

18. A method for transferring data between a processing element and a peripheral module, the method comprising the steps of:
receiving, by the peripheral module, a first read/write signal and a plurality of different addresses from an address bus; and
mapping, by the peripheral module, a plurality of different address offsets corresponding to the plurality of different addresses to a single y-bit wide data register by mapping a first address offset of the plurality of different address offsets to the data register for a y-bit wide data transfer and mapping x/y other address offsets of the plurality of different address offsets to the data register for an x-bit wide data transfer, wherein y is less than x; and
transferring, by the peripheral module, a y-bit wide data value from the y-bit wide data register to a data bus when the first read/write signal is in a read state, and transferring the y-bit wide data value from the data bus into the y-bit wide data register when the first read/write signal is in a write state.

19. The method of claim 18, further comprising the steps of:
executing, by the processing element, machine readable code that causes the processing element to perform a data transfer of an x-bit wide data value, wherein performing the data transfer includes providing a second read/write signal and a processing element-provided address that corresponds to the y-bit wide data register of the peripheral module, and wherein y is less than x;
receiving, by a bus controller, the second read/write signal and the processing element-provided address; and
performing, by the bus controller in response to receiving the second read/write signal, a series of multiple data transfers with the peripheral module, wherein performing the series includes providing the first read/write signal and an address of the plurality of different addresses for each data transfer in the series.

* * * * *